United States Patent
Mishra et al.

(10) Patent No.: US 10,805,182 B2
(45) Date of Patent: Oct. 13, 2020

(54) PROVISIONER DISASTER-RECOVERY FRAMEWORK FOR PLATFORM-AS-A-SERVICE OFFERING

(71) Applicant: SAP SE, Walldorf (DE)

(72) Inventors: Pritish Mishra, Bngalore (IN); Mayank Tiwary, Rourkela (IN)

(73) Assignee: SAP SE, Walldorf (DE)

( * ) Notice: Subject to any disclaimer, the term of this patent is extended or adjusted under 35 U.S.C. 154(b) by 175 days.

(21) Appl. No.: 16/208,818

(22) Filed: Dec. 4, 2018

(65) Prior Publication Data

US 2020/0177475 A1  Jun. 4, 2020

(51) Int. Cl.
| | |
|---|---|
| G06F 15/16 | (2006.01) |
| H04L 12/24 | (2006.01) |
| H04L 29/08 | (2006.01) |
| G06F 9/50 | (2006.01) |
| H04L 29/14 | (2006.01) |

(52) U.S. Cl.
CPC ........ *H04L 41/5054* (2013.01); *G06F 9/5077* (2013.01); *H04L 67/32* (2013.01); *H04L 69/40* (2013.01)

(58) Field of Classification Search
CPC ..... H04L 41/5054; H04L 67/32; H04L 69/40; G06F 9/5077
See application file for complete search history.

(56) References Cited

U.S. PATENT DOCUMENTS

| | | | |
|---|---|---|---|
| 7,886,021 B2 * | 2/2011 | Scheifler | G06F 9/5077 709/217 |
| 7,921,218 B2 * | 4/2011 | Cheng | H04L 12/2807 709/229 |
| 8,055,762 B2 * | 11/2011 | Messer | H04L 67/16 709/224 |
| 10,067,791 B2 * | 9/2018 | Bostic | G06F 9/50 |
| 2009/0271472 A1 * | 10/2009 | Scheifler | G06F 9/485 709/202 |
| 2014/0136712 A1 * | 5/2014 | Kim | H04L 47/70 709/226 |
| 2015/0358251 A1 * | 12/2015 | Varga | H04L 47/78 709/226 |
| 2016/0112342 A1 * | 4/2016 | Doi | H04L 47/78 709/226 |
| 2017/0163507 A1 * | 6/2017 | Pai | H04L 41/5025 |
| 2018/0026943 A1 * | 1/2018 | Call | H04L 29/06557 726/11 |
| 2018/0322118 A1 * | 11/2018 | Hu | H04L 41/5006 |
| 2019/0018703 A1 * | 1/2019 | Sedovic | G06F 16/27 |
| 2020/0133737 A1 * | 4/2020 | Gunaratne | G06F 9/5072 |

* cited by examiner

*Primary Examiner* — Moustafa M Meky
(74) *Attorney, Agent, or Firm* — Buckley, Maschoff & Talwalkar LLC

(57) ABSTRACT

A system and method is disclosed for recovering from any form of disaster-based deletion or loss of resource for a provisioner in a PaaS offering deployed on a cloud. Major architectural changes in the typical provisioner framework are provided along with algorithms to recover from any kind of disaster. Gap-points in existing recovery processes for a provisioner are solved with the algorithms described herein. In addition, disaster recovery for an entire tenant in a provisioner framework may be provided in accordance with some embodiments. In other words, a solution is described in which a user/customer is able to recover a previous state with zero-data loss and zero-re-configuration cost in any scenario of resource deletion.

20 Claims, 22 Drawing Sheets

PROVISIONER DISASTER-RECOVERY FRAMEWORK FOR PLATFORM-AS-A-SERVICE OFFERING

BACKGROUND

A user, such as an enterprise, may use a cloud computing offering to run applications and/or to provide services. For example, a Platform-As-A-Service offering might process purchase orders, perform human resources functions, etc. Moreover, in some cases a "tenant" may be established to let multiple users of an enterprise (e.g., with different roles or privileges) access a portion of the Platform-As-A-Service offering—and a separate instance may be established for each user. In some cases, a user might accidently delete an instance (or even a whole tenant. Existing systems provide only a limited ability to recover from these types of situations (e.g., "disaster-recovery"). In addition, both data costs and re-configuration costs can be associated with such recovery operations (which can be a time consuming and expensive process). Even worse, if an entire tenant has been accidently deleted, recovery of the previous state might not be possible at all.

It would therefore be desirable to provide a provisioner disaster-recovery framework for a Platform-As-A-Service offering in a fast, automatic, and accurate manner.

SUMMARY

According to some embodiments, methods and systems may be associated with a disaster-recovery framework or system that includes a provisioner data store containing information about existing resources and an orphaned data store containing information about deleted resources. Embodiments are disclosed to recover from any form of disaster-based deletion or loss of resource for a provisioner in a PaaS offering deployed on a cloud. Major architectural changes in the typical provisioner framework are provided along with algorithms to recover from any kind of disaster. Gap-points in existing recovery processes for a provisioner are solved with the algorithms described herein. In addition, disaster recovery for an entire tenant in a provisioner framework may be provided in accordance with some embodiments. In other words, a solution is described in which a user/customer is able to recover a previous state with zero-data loss and zero-re-configuration cost in any scenario of resource deletion.

Some embodiments comprise: means for receiving a request, originated by a user, to create a first resource; means for generating, by a provisioner platform, a universally unique identifier U for the first resource that is not already associated with another resource in a provisioner data store containing information about existing resources; means for creating and storing, by the provisioner platform, mappings for the first resource, along with U, in the provisioner data store identifying IaaS resource information; and means for generating a response to the user indicating that the first resource has been provisioned.

Some technical advantages of some embodiments disclosed herein are improved systems and methods to provide a provisioner disaster-recovery framework for a Platform-As-A-Service offering in a fast, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
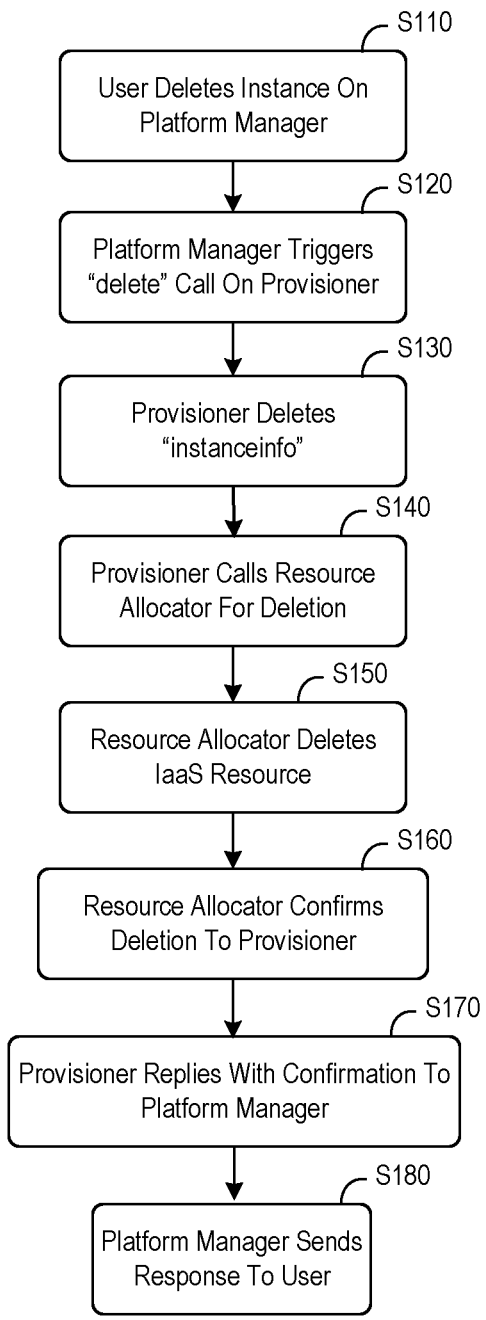
FIG. 1 illustrates a deletion flow method for a Platform-As-A-Service offering.

FIG. 1 illustrates a deletion flow method for a customer of a typical Platform-As-A-Service offering. At S110, a user deletes an instance, which triggers a "delete instance" call on a platform manager at S120. This request is forwarded by the platform manager to a provisioner which deletes "instanceinfo" from its database at S130. The provisioner then triggers a deletion on the resource at S140 to a resource allocator using the mapped "instance info" returned previously by provisioner. The resource allocator then deletes the IaaS resource at S150 using an IaaS client. The resource allocator confirms the deletion to the provisioner at S160. The provisioner then returns a confirmation to the platform manager at S170 with the response to the deletion operation. The platform manager then relays this response code back to the user at S180.

Figure 2A:
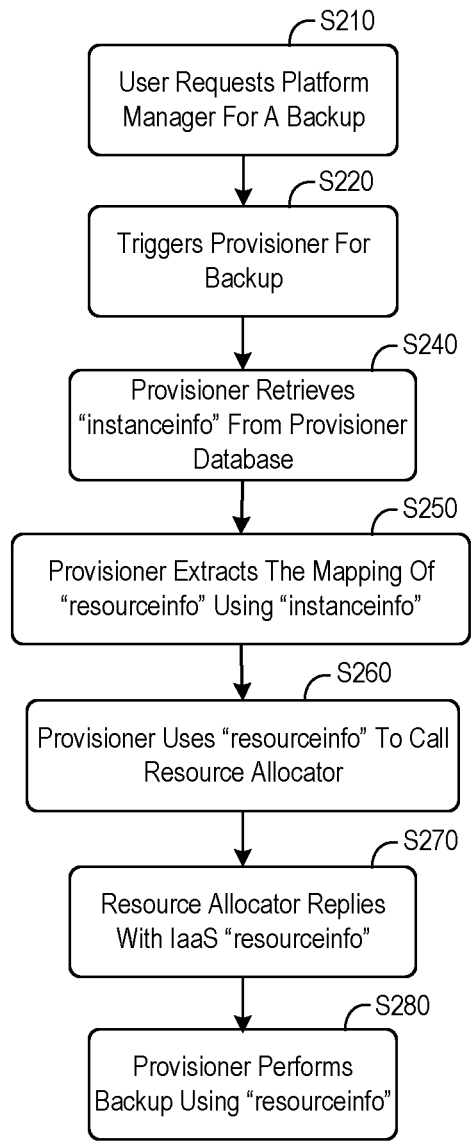
FIGS. 2A and 2B illustrate backup and restore methods for a Platform-As-A-Service offering.

Note that the deletion performed in FIG. 1 may have been accidental, and the user may wish to un-do the process. FIG. 2A illustrates a backup method for a Platform-As-A-Service offering. To recover from such a scenario (e.g., disaster-based recovery), current architectures maintain a backup and restore flow. In some cases, a user might backup his or her instance (data) on a periodic basis at S210. For example, the backup request may be triggered on a provisioner at S220, which then retrieves "instanceinfo" from a provisioner database at S240. Note that the provisioner may hold the mapping between the instance and the IaaS resource info used by the resource allocator. At S250, the provisioner extracts the mapping of "resourceinfo" using "instanceinfo," and uses "resourceinfo" to call the resource allocator at S260. The resource allocator uses this mapping to take the backup of the instance. In particular, the resource allocator replies with the IaaS "resourceinfo" at S270, and the provisioner performs the backup using "resourceinfo" at S280.

Figure 2B:
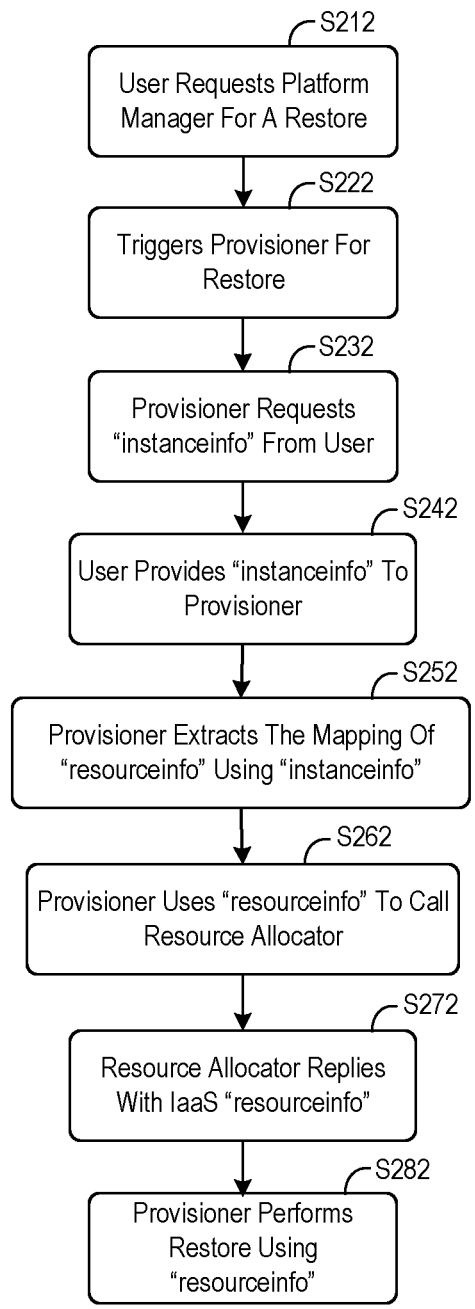

For disaster-based recovery, FIG. 2B illustrates that the user could request to restore this instance at S212. The flow of this process might be similar to the backup of FIG. 2A. The restore request comes to (and triggers) the provisioner at S222. However, unlike the flow in the backup, the provisioner doesn't have "instanceinfo" because (as described in the delete flow of FIG. 1), the "instanceinfo" is deleted from the provisioner database. As a result, at S232 the provisioner requests "instanceinfo" from the user. At S242, the user provides the "instanceinfo" to the provisioner. Then, the provisioner extracts the mapping of "resourceinfo" using "instanceinfo" at S252. The provisioner uses "resourceinfo" to call the resource allocator at S262 which replies with IaaS "resourceinfo" at S272. Without the IaaS resource information, the restore process ending with the restoration of the deleted instance by the provisioner using "resourceinfo" at S282 is not possible.

Note that the processes explained above pertaining to FIG. 1, 2A and 2B capture the flow of operations which were prevalent prior to embodiments of the present invention. In connection with FIGS. 3 through 15, an explanation will be provided regarding the problems associated with such an approach and why embodiments of the present invention are beneficial. One problem to consider is that "instanceinfo" is a complicated data object containing several fields and information. This level of detail couldn't be provided by the user. This problem might be somewhat resolved by the platform manager with some type of workaround. However, no concrete solution exists to solve this problem of disaster-recovery.

Another problem in the field of disaster-recovery is the deletion of a tenant itself. The concept of tenant is that it holds a multiple number of instances under itself. Moreover, a tenant may be accessible to a number of different users each having varying privileges. Now, consider a scenario in which a user having administrator privileges deletes a tenant, which in turn leads to deletion of all instances within itself. This deletion could lead to a disaster if the deletion was unintentional/malicious or unintended for other users of the tenant. A disaster-recovery process for such a use-case is currently absent in existing architectures.

Figure 3:
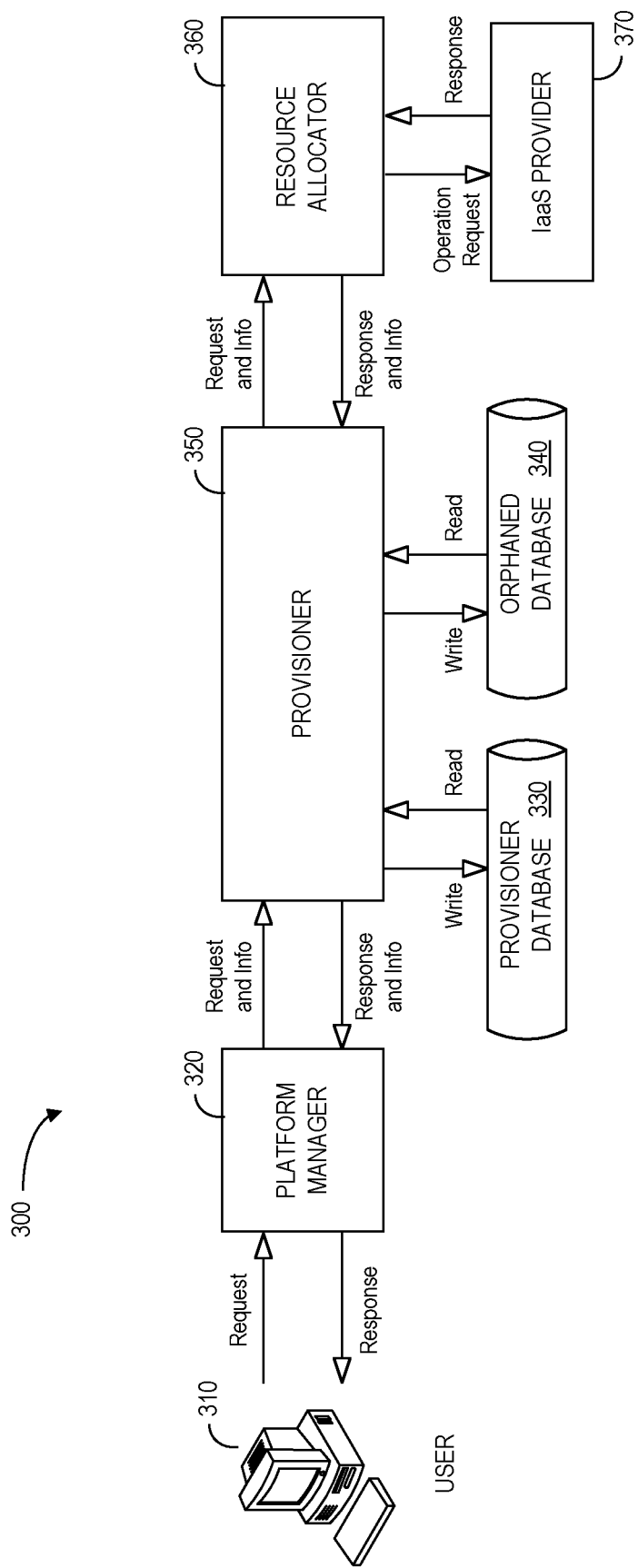
FIG. 3 is a high-level block diagram of a disaster-recovery system in accordance with some embodiments.

To avoid such problems, FIG. 3 is a high-level block diagram of a system 300 or disaster-recovery framework in accordance with some embodiments. The system 300 includes a user device 310 that sends a request (e.g., delete, backup, restore, etc.) to a provisioner 350 via a platform manager 320. As will be described, the provisioner 350 may access (e.g., read from and write to) a provisioner database 330 and an orphaned database 340 and arrange to respond to the request using a resource allocator 360 to communicate with an IaaS provider 370. This process might be performed automatically or be initiated via a simple command from a remote operator interface device. As used herein, the term "automatically" may refer to, for example, actions that can be performed with little or no human intervention.

As used herein, the phrase "IaaS Provider" may refer to any shared pools of configurable computer system resources and higher-level services that can be rapidly provisioned with minimal management effort (e.g., via the Internet). According to some embodiments, the IaaS Provider 370 may be associated with an Infrastructure-as-a-Service ("IaaS") data center that provides high-level Application Programming Interfaces ("APIs") to de-reference various low-level details of an underlying network infrastructure like physical computing resources, location, data partitioning, scaling, security, backup, etc. According to other embodiments, the IaaS Provider 370 can be used along with a Platform-as-a-Service ("PaaS") offering that provides a platform allowing user to develop, run, and manage applications without the complexity of building and maintaining the infrastructure typically associated with developing and launching applications.

According to some embodiments, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The provisioner 350 may store information into and/or retrieve information from various data stores (e.g., the provisioner database 330 and orphaned database 340), which may be locally stored or reside remote from the provisioner 350. Although a single provisioner 350 is shown in FIG. 3, any number of such devices may be included. Moreover, various devices described herein might be combined according to embodiments of the present invention. For example, in some embodiments, the platform manager 320 and provisioner 350 might comprise a single apparatus. The system 300 functions may be performed by a constellation of networked apparatuses, such as in a distributed processing or cloud-based architecture.

The user 310 may access the system 300 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to direct or initiate a deletion, backup, or restore process) and/or provide or receive automatically generated recommendations or results from the system 300.

Note that FIG. 3 represents an overall architecture according to some embodiments that is divided into three layers: the platform manager 320, the provisioner 350, and the resource allocator 360. A more detailed description of each layer will now be provided. The user 310 might trigger various requests depending on his or her access privileges. The requests could be create/delete of a tenant or an instance within the tenant. As the user 310 may have delete permissions with himself, this could lead to an accidental deletion or a disastrous deletion activity. Further, the user 310 may want to get the data back, if the deletion was unintentional and the data un-comprisable. Thus, the request could also be to restore an instance or to take backups of an instance periodically. If the user 310 wants to restore an entire tenant, the request could also be to restore a tenant.

Any request fired from the user 310 is received by the platform manager 320 which acts as a medium to co-ordinate between the provisioner 350 and the user 310. Note that the platform manager 320 could be as simple as a web-server client or as complicated as a service-broker. The basic functionality of the platform manager 320, however, is to forward the request received from the user 310 to the provisioner 350 along with additional required information for the provisioner 350 and to relay the response received from the provisioner 350 back to the user 310.

Any action performed by the provisioner 350 involves a read-operation and/or a write-operation in the databases 330, 340. For example, if a create instance operation is being executed, an entry for the new instance (including the "instanceinfo") is written onto the databases 330, 340. Similarly, the tenant where this instance should be placed in is determined by a read-operation of the tenant info from the databases 330, 340.

Note that the architecture maintains two forms of databases: the provisioner database 330 and the orphaned database 340. The purpose of provisioner database 330 is to hold the information about all the existing alive instances, tenants, and information related to them. The orphaned database 340 holds the information about all the deleted instances, tenants, and the information related to them. If any restore or recovery operation has to be performed on an instance/tenant, the orphaned database 340 holds the needed information according to some embodiments.

The provisioner 350 maintains the provisioner database 330 with information about the instances/tenants. However, there may be a physical cloud computing 370 resource attached to this instance. This cloud computing 370 resource allocation is managed by the resource allocator 360. The request is forwarded by the provisioner 350. The provisioner 350 holds a mapping between the instanceinfo that it created/possesses and the resourceinfo returned by the resource allocator 360. Without this mapping, accessing the cloud computing 370 resource for any operation (e.g., backup, restore, etc.) may not be possible.

Figure 4:
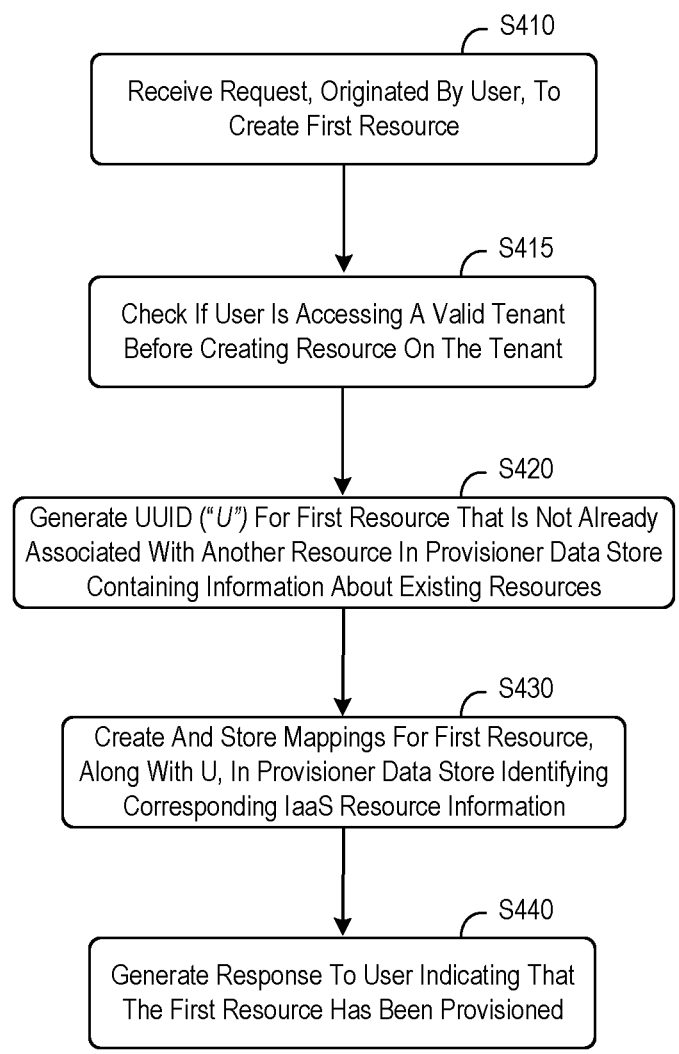
FIG. 4 is illustrates a creation/provisioning flow method for a Platform-As-A-Service offering according to some embodiments.

FIG. 4 illustrates a creation/provisioning flow method for a PaaS offering according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, a provisioner platform may receive a request, originated by a user, to create a first resource. At S415, the system may check if the user is accessing a valid tenant before creating a resource on the tenant. At S420, the provisioner platform may generate a Universally Unique Identifier ("UUID") U for the first resource that is not already associated with another resource in a provisioner data store containing information about existing resources. At S430, the provisioner platform may create and store mappings for the first resource, along with U, in a provisioner data store identifying corresponding IaaS resource information. The system may then, according to some embodiments, generate a response to the user indicating that the first resource has been provisioned at S440. A more detailed description of this process is provided with respect to FIGS. 6A and 6B.

Figure 5:
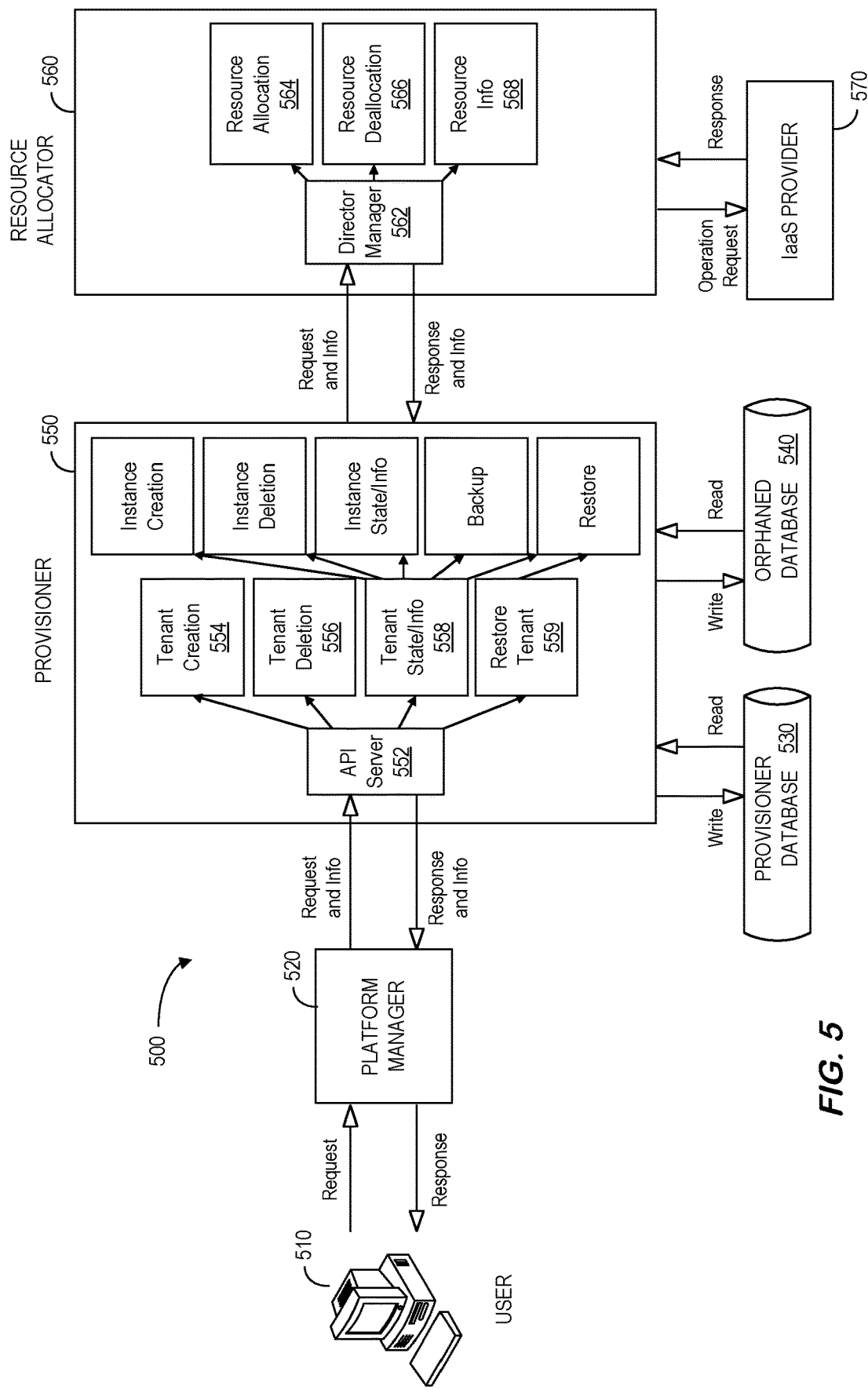
FIG. 5 is a more detailed block diagram of a disaster-recovery system in accordance with some embodiments.

FIG. 5 is a more detailed block diagram of a disaster-recovery system 500 in accordance with some embodiments. As before, a user device 510 sends a request (e.g., delete, backup, restore, etc.) to a provisioner 550 via a platform manager 520. As will be described, the provisioner 550 may access (e.g., read from and write to) a provisioner database 530 and an orphaned database 540 and arrange to respond to the request using a resource allocator 560 to communicate with an IaaS provider 570.

In this embodiment, the provisioner is further categorized into various modules depending on the functionality each of them provides. First, the request sent by the platform manager 520 is received at an API server module 552 which parses the request and, depending on the various parameters provided therein, decides which module should receive the request. For example, a create tenant request is forwarded to a tenant creation module 554. Similar routes are provided for a tenant deletion module 556 and a restore tenant module 559. Similarly, any event related to an instance must be routed through a tenant state/info module 558 since it provides the tenant information where instance is/should be hosted. Further, the call goes to the respective instance-based modules (e.g., for delete to an instance deletion module, and likewise for instance creation, instance state/info, backup, and restore functions, etc.).

A director manager 562 in the resource allocator 560 may receive a request from the provisioner 550 and forward the action to a resource allocation module 562, resource deallocation module 566, or resource info module 568 depending on the type of request being received. These modules 564, 566, 568 may further interact with the IaaS 570 to provision or deprovision the resource as appropriate.

Figure 6A:
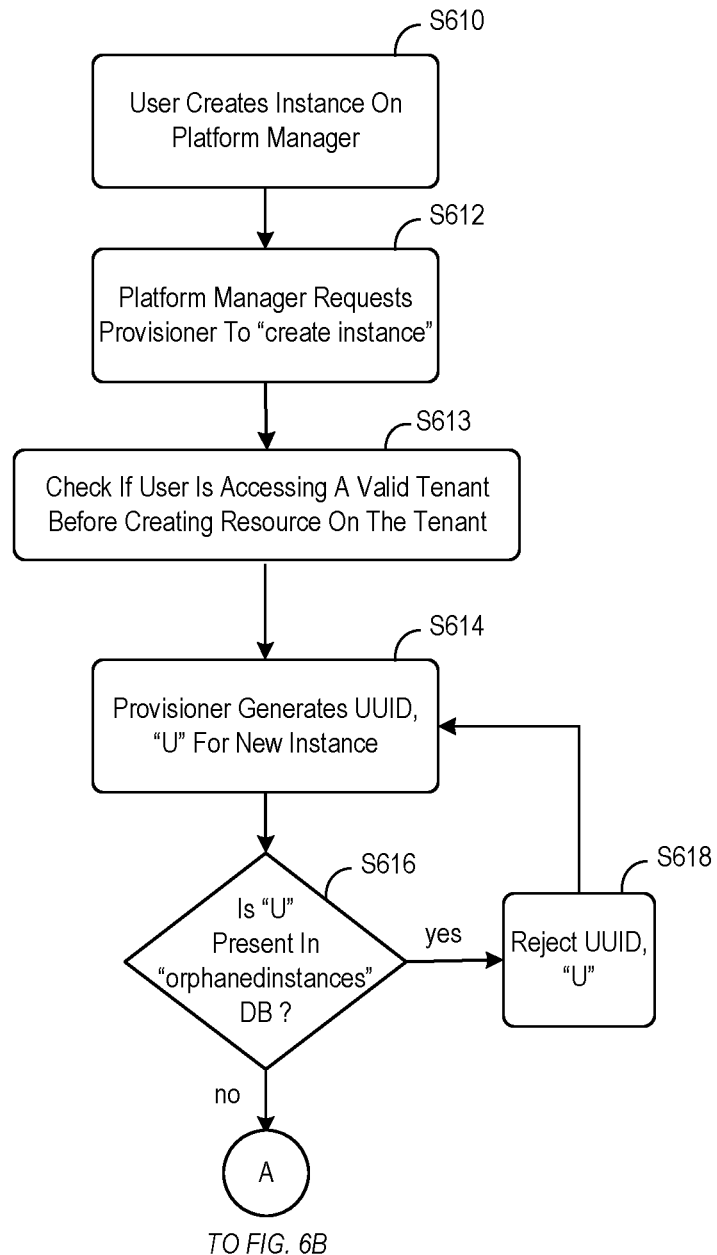
FIGS. 6A through 6B illustrate a provisioning scenario method according to some embodiments.
Figure 6B:
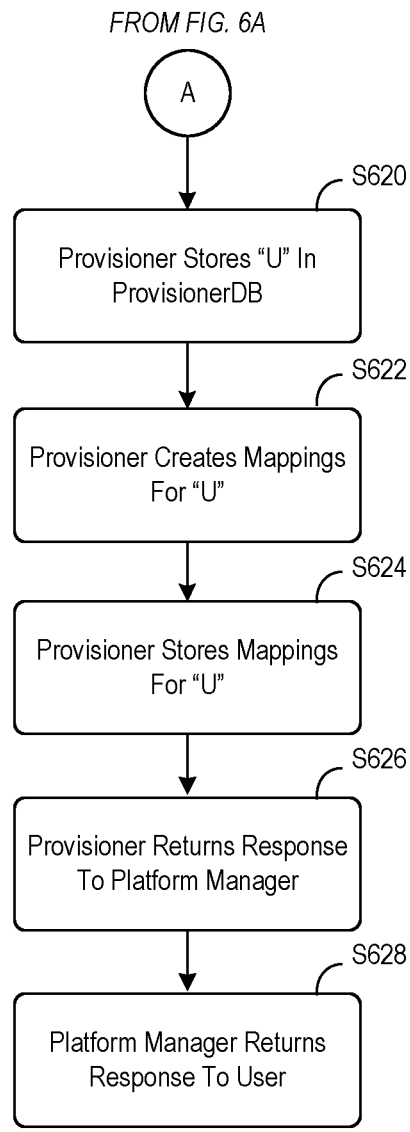

FIGS. 6A through 6B illustrate a provisioning scenario according to some embodiments. At S610, a user creates an instance on a platform manager. The platform manager then requests the call to the provisioner at S612. At S613, the system checks if the user is accessing a valid tenant before creating a resource on the tenant. The provisioner generates "unique identifier", otherwise known as a UUID, for the new instance at S614. This UUID should be unique for each instance, because an instance could be deleted and present in the orphaned database (this flow is described in later figures). As a result, the provisioner first searches in the orphaned database for an entry with a key identical to the generated UUID at S616. If such an entry is found at S616, the generated UUID at S618 is rejected and the re-generation is triggered at S614. If, however, no such entry is found at S616, the provisioner goes ahead with the provisioning by storing U in the provisioner database at S620. The provisioner may then create mappings for the instance at S622. These mappings could be details like Service Info (Service Name, Service ID, etc.) of the instance, Plan Info (Plan Name, Plan ID, etc.) of the instance, etc. These mappings are then stored in the provisioner database along the UUID at S624. The Provisioner then returns appropriate response to the platform manager at S626 which relays the same back to the user at S628.

Consider, for example, a provisioning of various entities defined in the architecture like instances, spaces, and orgs. A snapshot representation of various operations performed on the provisioner component using a Command Line Interface ("CLI") may be provided by the Provisioner. Initially, a user may create an org named "test org" using a "create-org" command and then can view the created org using a "show-orgs" command. A database entry may then be generated responsive to the operation in the provisioner database (e.g., and might be viewed from the backend, such as from the perspective of a database administrator).

A space "test_space" may be created in the org "test_org." As previously described, a space cannot exist without being inside an org. Thus, the space, "test_space" is created under "test_org." The user may then attempt creating an instance. Note that no particular org/space might be targeted by mistake. In other words, the org or space where the instance is to be provisioned in is not selected. Since an instance is a dependency on these entities, this operation cannot succeed. Thus, the user should "target" an org and a space inside the org and hence define the tenant where the instance can be provisioned.

Now, the instance, "test_instance" can be provisioned using the command, "create-instance" (and the user view the instance using a "show-instances" command)

Figure 7A:
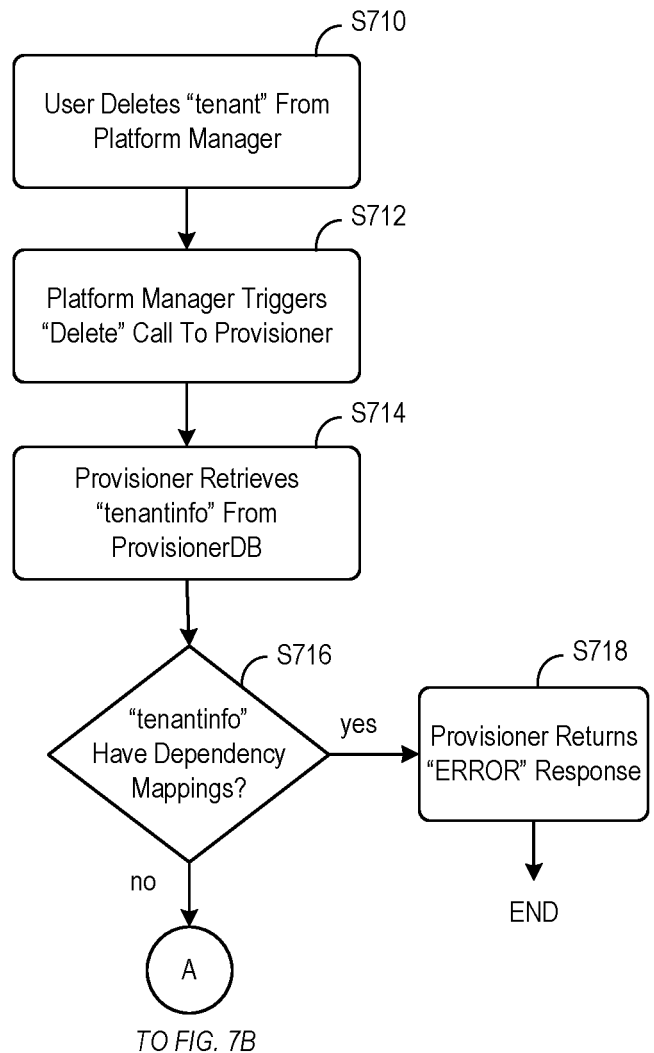
FIGS. 7A through 7C illustrate a de-provisioning scenario in accordance with some embodiments.
Figure 7B:
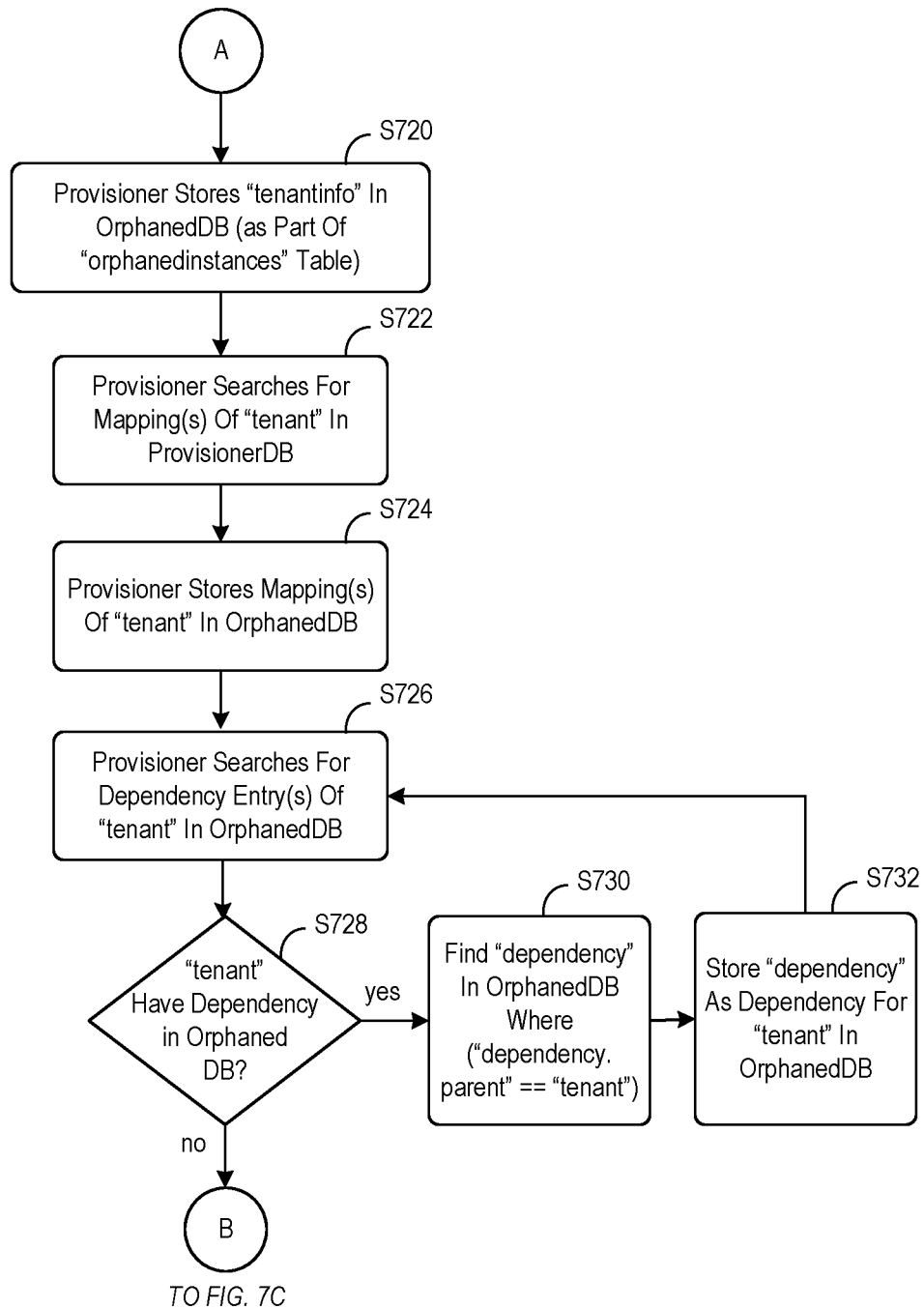
Figure 7C:
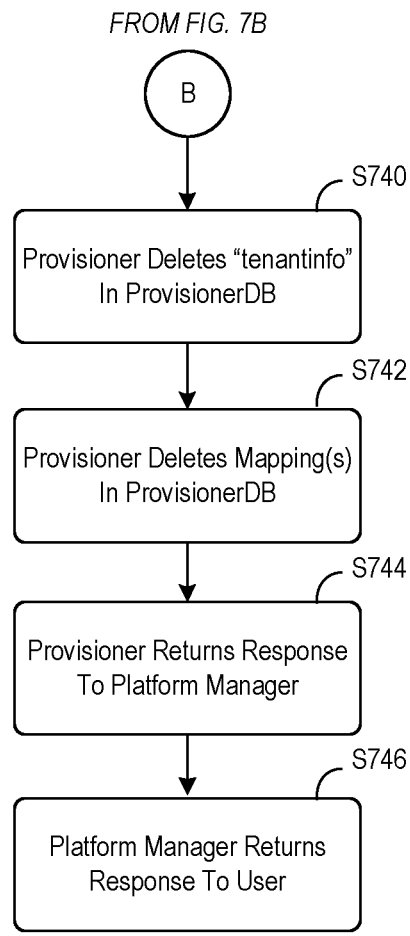
Figure 8A:
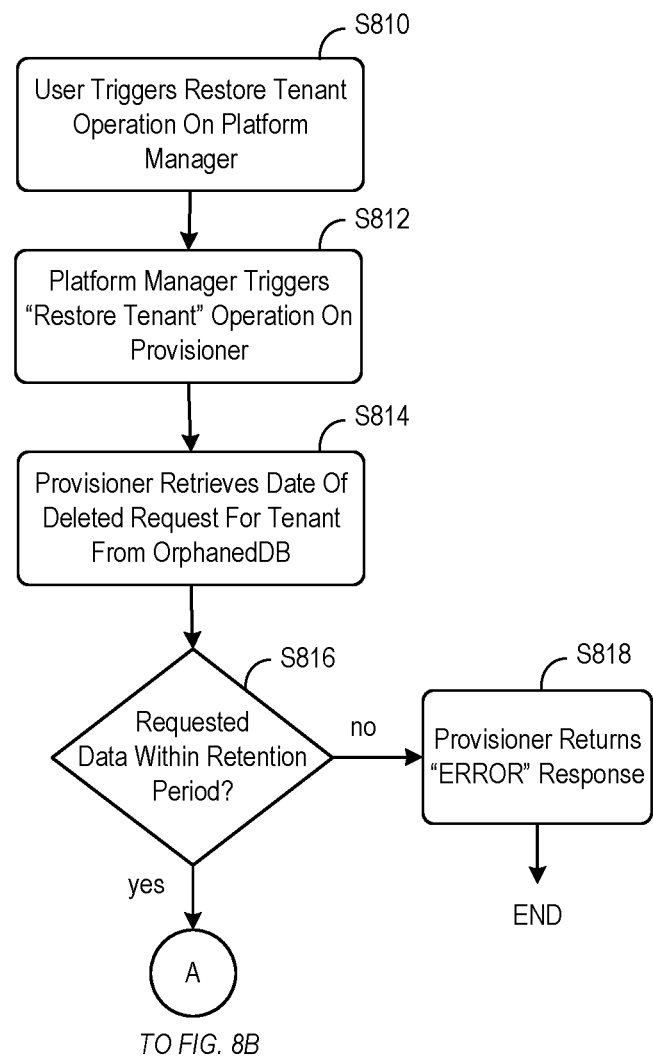
FIGS. 8A through 8D illustrate a disaster-based recovery scenario according to some embodiments.
Figure 8B:
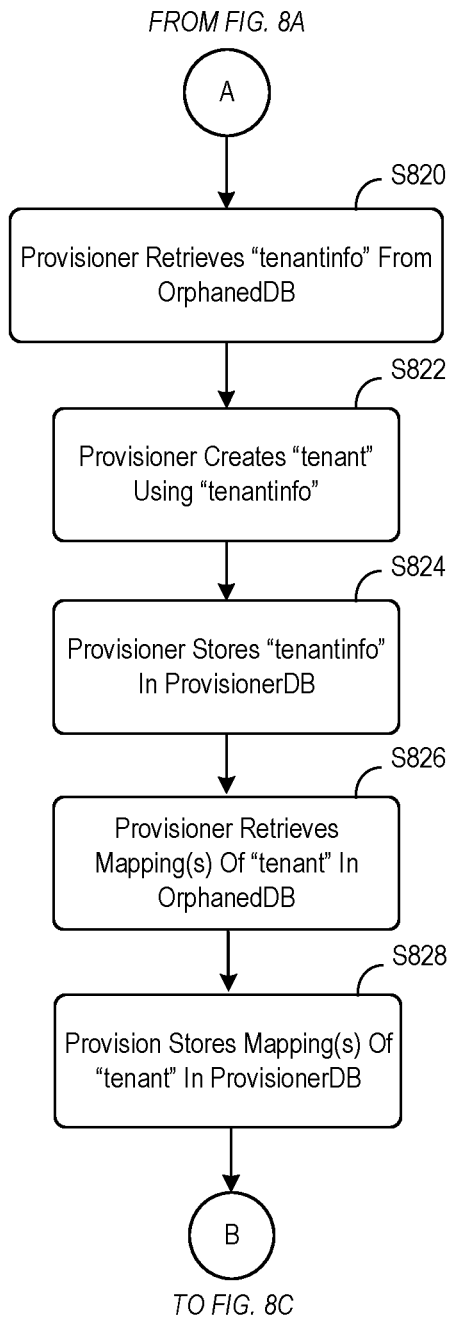
Figure 8C:
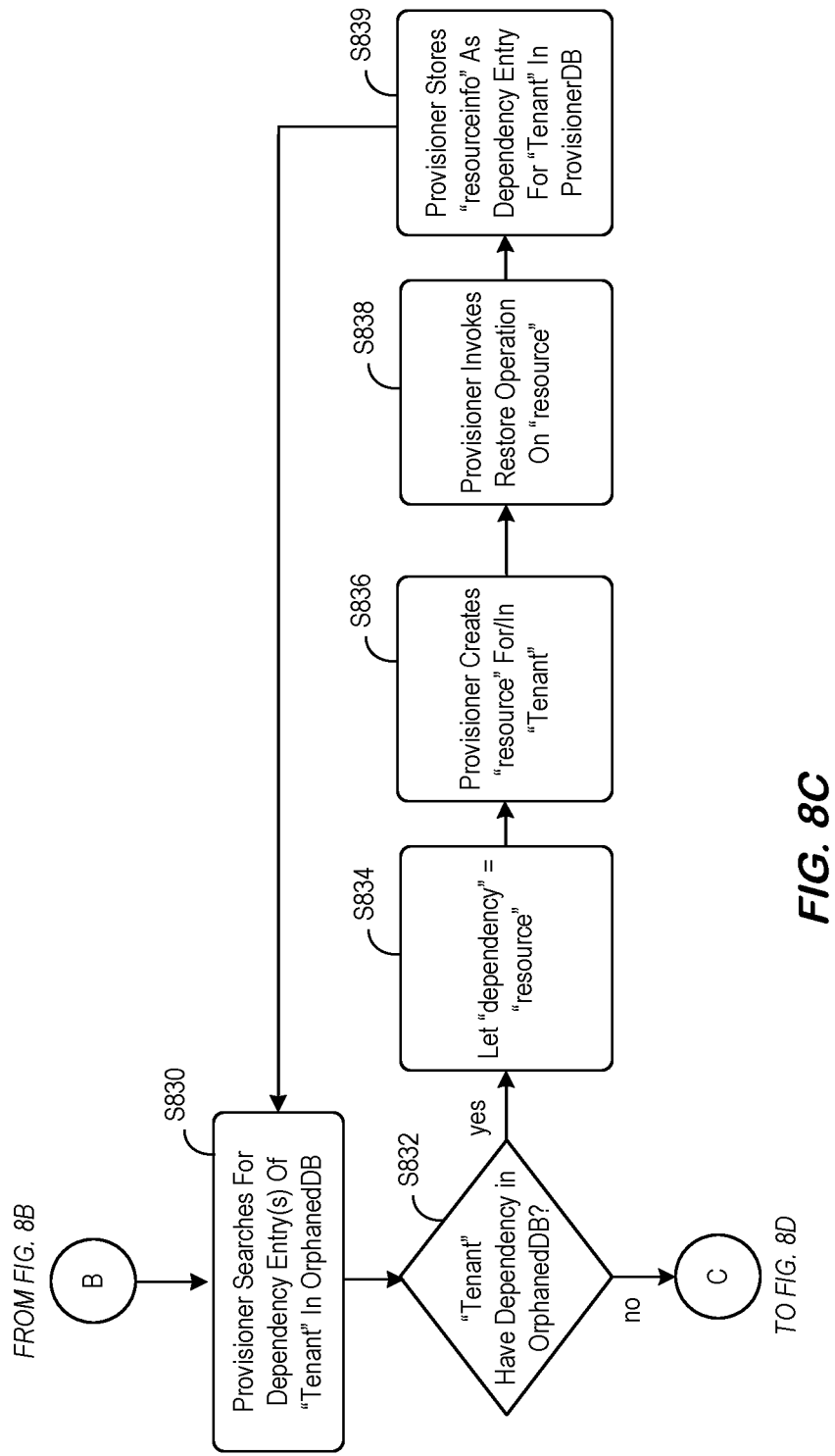
Figure 8D:
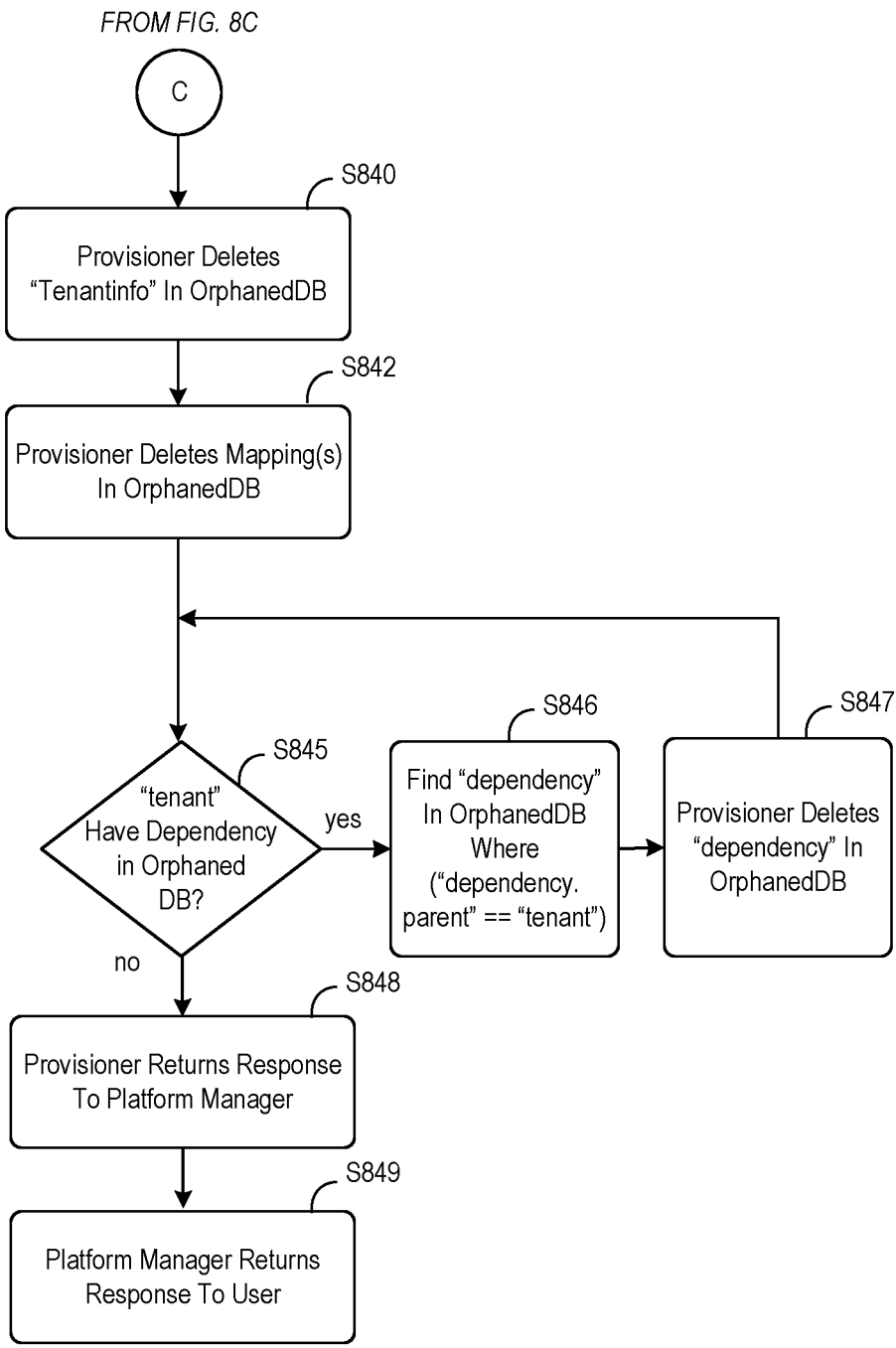

FIGS. 7A through 7C illustrate a de-provisioning scenario in accordance with some embodiments. One aspect to note here is the deprovisioning flow remains the same for an instance as well as a tenant. Hence, the term "tenant" as it is used all throughout this flow can be replaced with the term "instance" and the meaning and flow remains intact.

At S710, a user triggers deletion of "tenant" from the platform manager. The platform manager then forwards the call to the provisioner at S712. At S714, the provisioner retrieves "tenantinfo" from the provisioner database. The provisioner, however, first needs to determine if the tenant has any dependency in the provisioner database (the details and significance of the terms "dependency" and "mapping" are described in later figures). If any "tenantinfo" dependency is found in the provisioner database at S716, an "ERROR" is returned at S718 and the deletion cannot proceed. Thus, in other words, all dependencies of an instance must first be deleted before moving ahead with deletion of a tenant.

If the provisioner finds no such dependency in the provisioner database at S718, it proceeds with storing the "tenantinfo" in the orphaned database at S720 as part of an entry in the "orphanedinstances" table. Next, the provisioner may search for "mappings" of "tenant" in the provisioner database at 722. If any such mapping is found, it stores the mappings of the "tenant" in the orphaned database at S724 along the instance UUID and "tenant" information.

Now consider the case where a tenant is being deleted. As mentioned earlier, FIG. 7 is applicable to both an instance as well as a tenant. For a tenant, an instance is dependency. This instance must have been deleted earlier, if the user is proceeding with the deletion of the tenant. As a result, the instance info must have been stored in the orphaned database. Since the tenant itself is getting deleted, the mapping between the tenant and the instance must be stored. This is because, when a user attempts to restore the tenant, all dependencies must be restored to enable a full revival of the original state. Thus, any dependency of the tenant must be stored along the tenant info in the orphaned database.

Referring again to FIG. 7B, the provisioner searches the orphaned database for any entry of "tenant" whose UUID matches the same as the "tenant" to be deleted at S726. If such a match is found at S728, it is termed as a dependency and is stored alongside the "tenant" entry in the orphaned database at S730 and S732. This process is repeated for every such match.

The provisioner may then delete "tenantinfo" from the provisioner database at S740. Further, it iteratively deletes all the mappings of the tenant present in the provisioner database at S742. The provisioner may then return the response back to the platform manager at S744 which relays the same back to the user at S746.

Consider, for example, a user who deletes an instance "test_instance" resulting in a deletion of the associated entry from the provisioner database. If the user wants to visualize all the instances named "test_instance" that he has deleted, he or she can do so using a "show-deleted-instance" command. Suppose the user created another instance with the same name "test_instance" and also deleted that instance. Now, the user needs to decide which version of "test_instance" he wants to restore. Using the "show-deleted-instance" command, to view multiple deletions of the instance with same instance-name may let the user easily select the UUID as the version of the instance to be restored.

FIGS. 8A through 8D illustrate a disaster-based recovery scenario according to some embodiments. At S810, a user triggers a restore tenant operation on the platform manager. At S812, the platform manager forwards the request to the provisioner. The provisioner checks in the orphaned database at S814 for the date when the tenant was deleted. Note that the date when the restore is requested must be within a "retention period" of the deletion date. The purpose of defining this window is to avoid the overhead of maintaining a substantial volume of orphaned resources and their details, mappings, and dependencies. The "retention period" can be defined by the platform or provisioner depending on the Service Level Agreement ("SLA") to be provided. If the request doesn't fall within the retention period at S816, an "ERROR" is returned at S818 and the process ends. If the request is within the retention period, provisioner proceeds with the restore flow.

The provisioner may first search the orphaned database for "tenantinfo" (the user only needs to have provided a tenant name) at S820. Note that there could be multiple occurrences of deleted tenants. Thus, the provisioner may prompt the user to select which tenant should be restored. The user can choose, for example, based on the deletion date and time of the tenant. The provisioner may then retrieve the tenant info from the orphaned database. This information could include tenant ID (UUID), tenant name, etc.

The provisioner may then trigger the creation of "tenantinfo" with same name and ID (UUID) at S822. If a tenant of same name already exists, it will generate an "ERROR." If no tenant exists with that name, the provisioner stores the "tenantinfo" in the provisioner database at S824. Next, the provisioner may search for mappings of the tenant in the orphaned database at S826. Upon finding any such mapping, the provisioner may store the mappings of the tenant in the provisioner database at S828 along the newly created entry for the restored tenant.

At S830, the provisioner may search the orphaned database for any dependency. Note that every such dependency found at S832 must also be restored to the similar state for the completion of the restore process. The provisioner then proceeds with the creation of the resource (and this resource could be an instance) at S836. The same flow for provisioning of instance is repeated (as described in previous flow), with one exception. The name and the ID (UUID) of the instance must remain the same as given in the entry in the orphaned database. The provisioner then follows the restore flow of an instance at S838 (as explained in the previous flow) and restores the state of the instance. If multiple occurrences of an instance exist, it prompts the user to select which point of time the user wants to restore. Finally, the provisioner may stores the dependency for the tenant back into the provisioner database at S839 to complete the restore of a dependency for a tenant. This process is repeated for all such dependencies to complete the flow of restore of a tenant.

The provisioner can now proceed with the deletion of tenant info in the orphaned database at S840. In particular, the provisioner can then recursively delete all of the mappings of the tenant in the orphaned database at S842. Note that the existence of a dependency (e.g., an instance) can be independent. However, since the tenant is a superset and an instance a subset of this, a restore of tenant has already ensured a restore of the instance. Thus, the need of restoring the instance is eliminated unless the same is deleted (which will re-populate the entry in orphaned database). If "tenant" has dependency in the OrphanedDB at S845, the system may find "dependency" in the orphanedDB where ("dependency".parent =="tenant" at S846 and the provisioner may delete the "dependency" from the orphanedDB at S874. At S846, the provisioner may return the response back to the platform manager which relays the same back to the user at S848.

Figure 9:
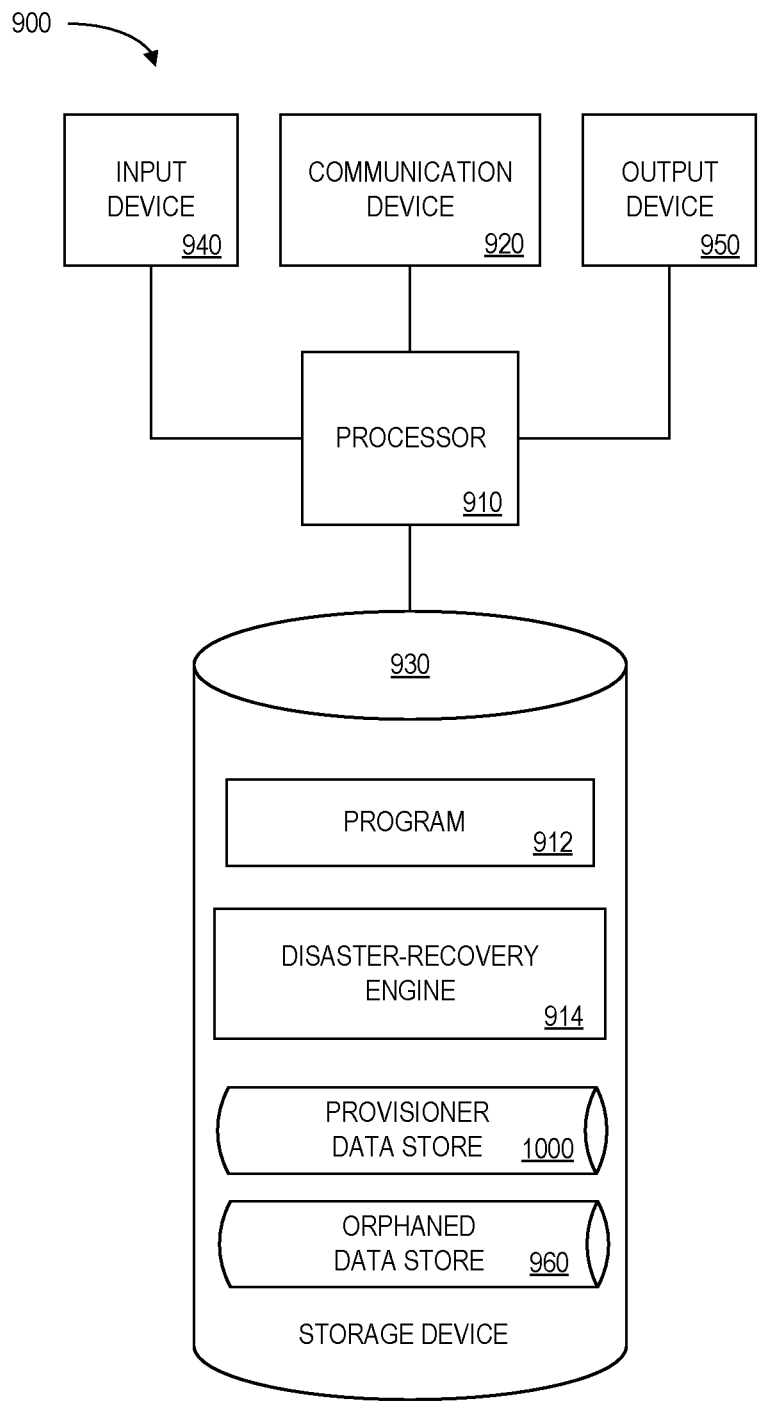
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the systems 300, 500 of FIGS. 3 and 5, respectively (and/or any other system described herein). The platform 900 comprises a processor 910, such as one or more commercially available Central Processing Units ("CPUs") in the form of one-chip microprocessors, coupled to a communication device 960 configured to communicate via a communication network (not shown in FIG. 9). The communication device 960 may be used to communicate, for example, with one or more remote user platforms, resource allocators, etc. The platform 900 further includes an input device 940 (e.g., a computer mouse and/or keyboard to input user privileges or retention periods) and/an output device 950 (e.g., a computer monitor to render a display, transmit recommendations, and/or create disaster-recovery reports). According to some embodiments, a mobile device and/or PC may be used to exchange information with the platform 900.

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or disaster-recovery engine 914 for controlling the processor 910. The processor 910 performs instructions of the programs 912, 914, and thereby operates in accordance with any of the embodiments described herein. For example, the processor 910 may receive a request, originated by a user, to create a first resource. The processor 910 may then generate a universally unique identifier U for the first resource that is not already associated with another resource in the provisioner data store. The processor 910 may create and store mappings for the first resource, along with U, in the provisioner data store identifying IaaS resource information. A response to the user indicating that the first resource has been provisioned may then be generated by the processor 910. Similarly, the processor 910 may delete and/or store resources, such as instances and tenants.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores an orphaned data store 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Figure 10:
FIG. 10 is portion of a tabular provisioner data store in accordance with some embodiments.

Referring to FIG. 10, a table is shown that represents the orphaned data store 1000 that may be stored at the platform 900 according to some embodiments. The table may include, for example, entries identifying resources (e.g., instances and tenants) that have been deleted by a provisioner. The table may also define fields 1002, 1004, 1006, 1008, 1010 for each of the entries. The fields 1002, 1004, 1006, 1008, 1010 may, according to some embodiments, specify: a UUID 1002, a resource name, an organization name, an organization UUID, and a deletion date and time. The orphaned data store 1000 may be created and updated, for example, when a resource is deleted, backed up, restored, etc.

The UUID 1002 might be a unique alphanumeric label or link that is associated with a particular resource (e.g., instance or tenant) that has been deleted by a provisioner (and may later be restored by a disaster-recovery framework). The resource name 1004 may describe the deleted resource. The organization name 1006 and organization UUID 1108 may indicate an organization associated with the resource. The deletion date and time 1010 might indicate when the provisioner deleted the resource. The deletion date and time 1010 might be used, according to some embodiments, to decide if a deleted resource is allowed to be restored (that is, the user is still within a retention period when he or she initiated the restoration process).

Figure 11:
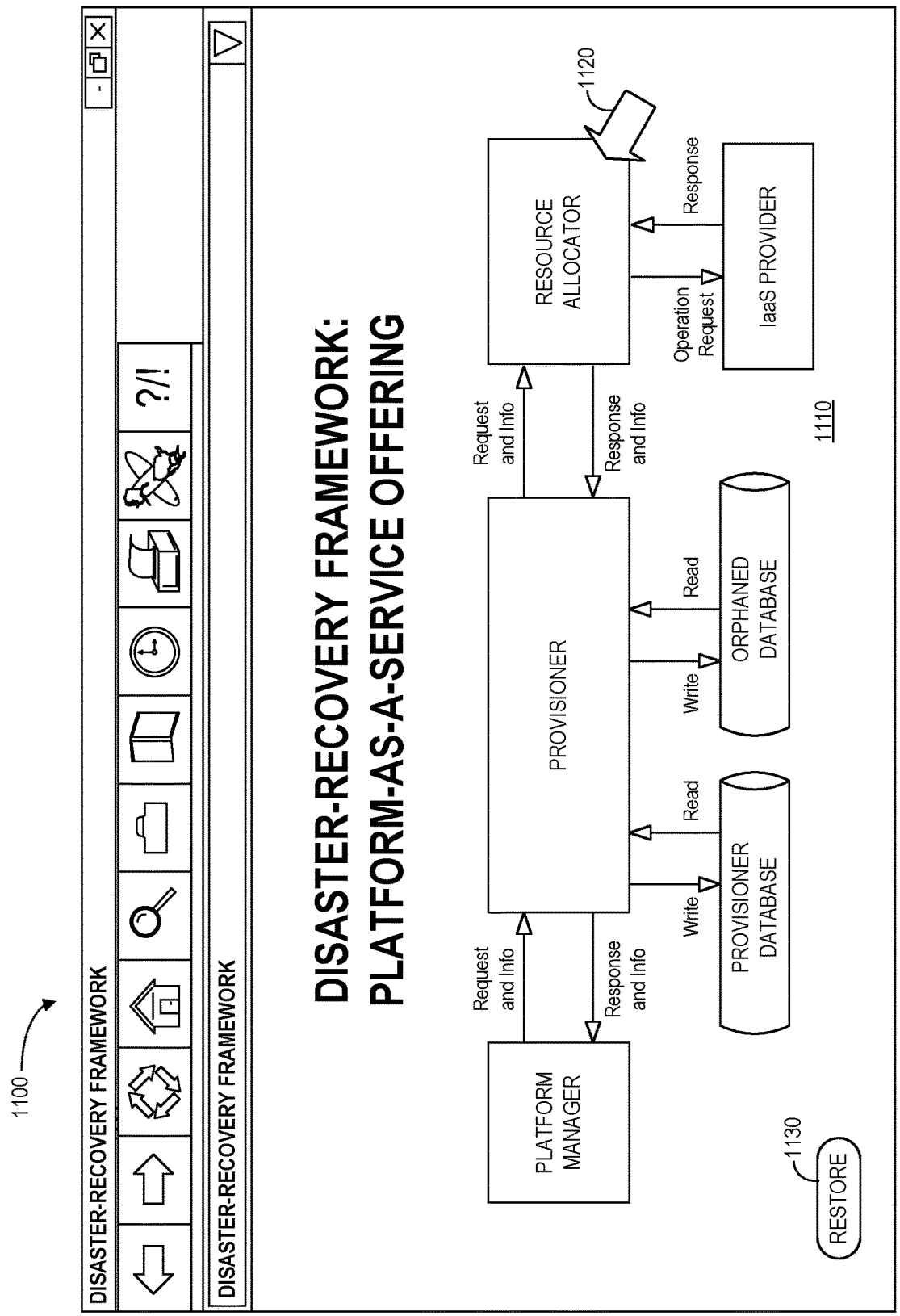
FIG. 11 is a human machine interface display according to some embodiments.

FIG. 11 is a human machine interface display 1100 in accordance with some embodiments. The display 1100 includes a graphical representation 1110 of elements of a disaster-recovery framework including a provisioner. Selection of an element (e.g., via a touch-screen or computer pointer 1120) may result in display of a pop-up window containing various options (e.g., to view a restoration status, request selection of a particular resource to be restored, etc.). The display 1100 may also include a user-selectable "Restore" icon to initiate an automated restoration of an accidentally deleted resource.

Figure 12:
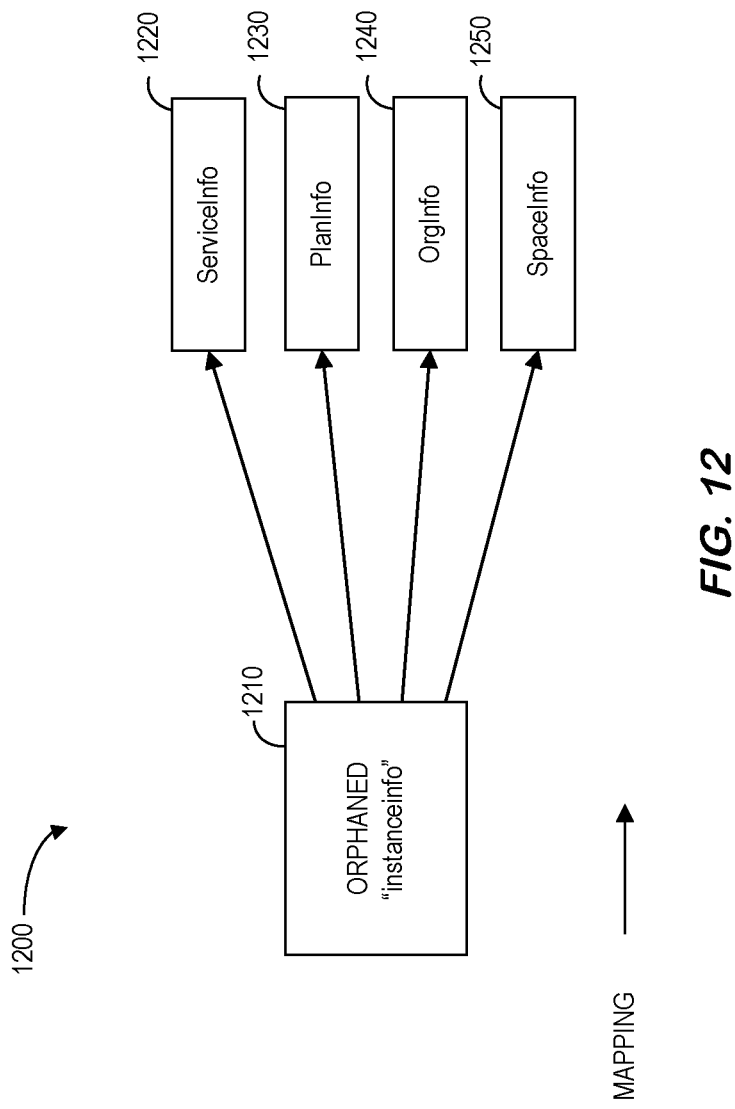
FIG. 12 illustrates a database schema for an "Orphaned-Instance" table in accordance with some embodiments.

FIG. 12 illustrates a database schema 1200 for an "OrphanedInstance" table in accordance with some embodiments. Some embodiments described herein introduce a new database named orphaned database. Note two important terms in the schema to help a designer create algorithms and operations to be performed on the database tables: dependency and mapping. An entity A is defined as a "dependency" on/for an entity B if entity A cannot exist without entity B. Understanding this with the help of an example, an instance is a dependency on/for a space. This is because, an instance can only exist if the space exists. If the space gets deleted, the instance becomes dangling and un-usable. Thus, before deleting an entity B, all its dependents (entities like A) must be deleted to avoid leaked resources. Similarly, during restore of an entity B, all its dependents (entities like A) must also be restored and the dependency re-established for the entire process to complete successfully.

On the other hand, an entity A is defined as a "mapping" of an entity B if A has its own independent existence and doesn't depend on the existence of B. Instead, it just serves as an attribute or property or defines extra information of entity B. As an example, service/plan info are mappings for an instance. If instance gets deleted, the system does not need to delete the service info (because another instance could also belong to the same service). Referring to FIG. 12, mappings between an orphaned "instanceinfo" 12210, ServiceInfo 1220, PlanInfo 1230, OrgInfo 1240, and SpaceInfo 1250 are illustrated.

Figure 13:
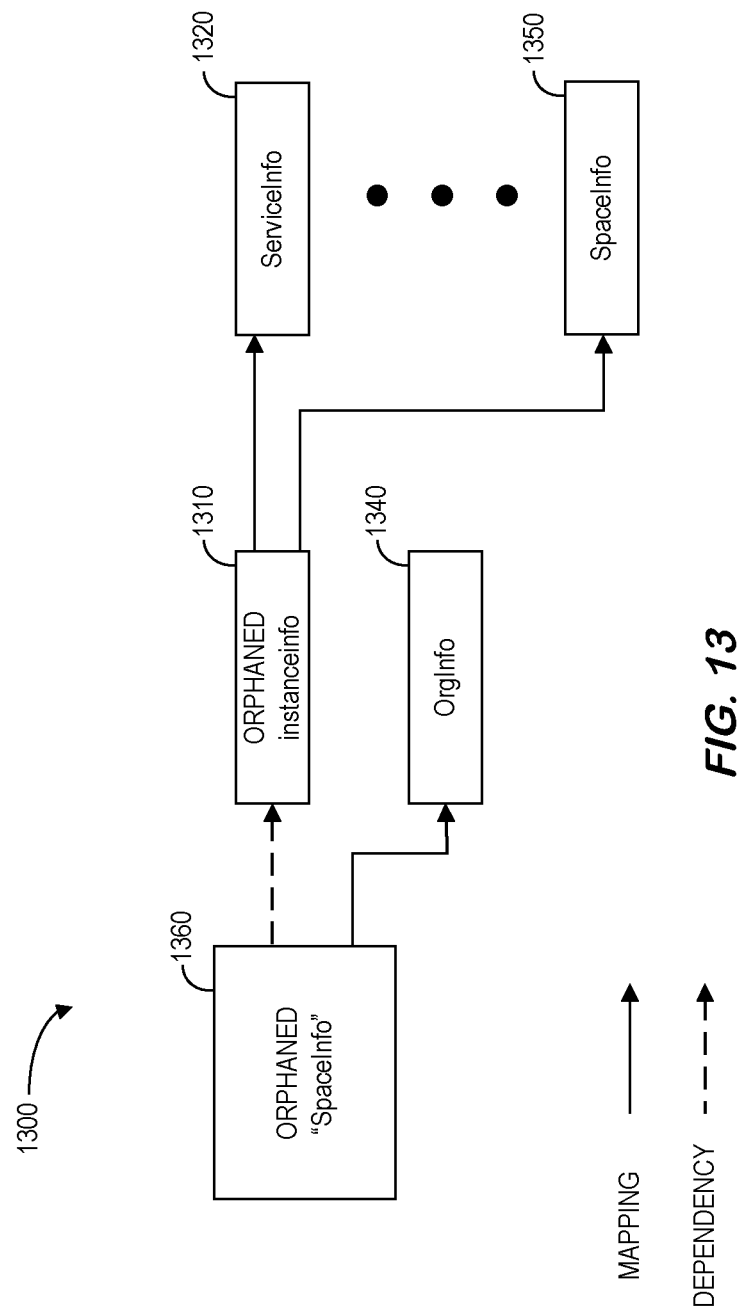
FIG. 13 illustrates a database schema for an "Orphaned-Space" table according to some embodiments.
Figure 14:
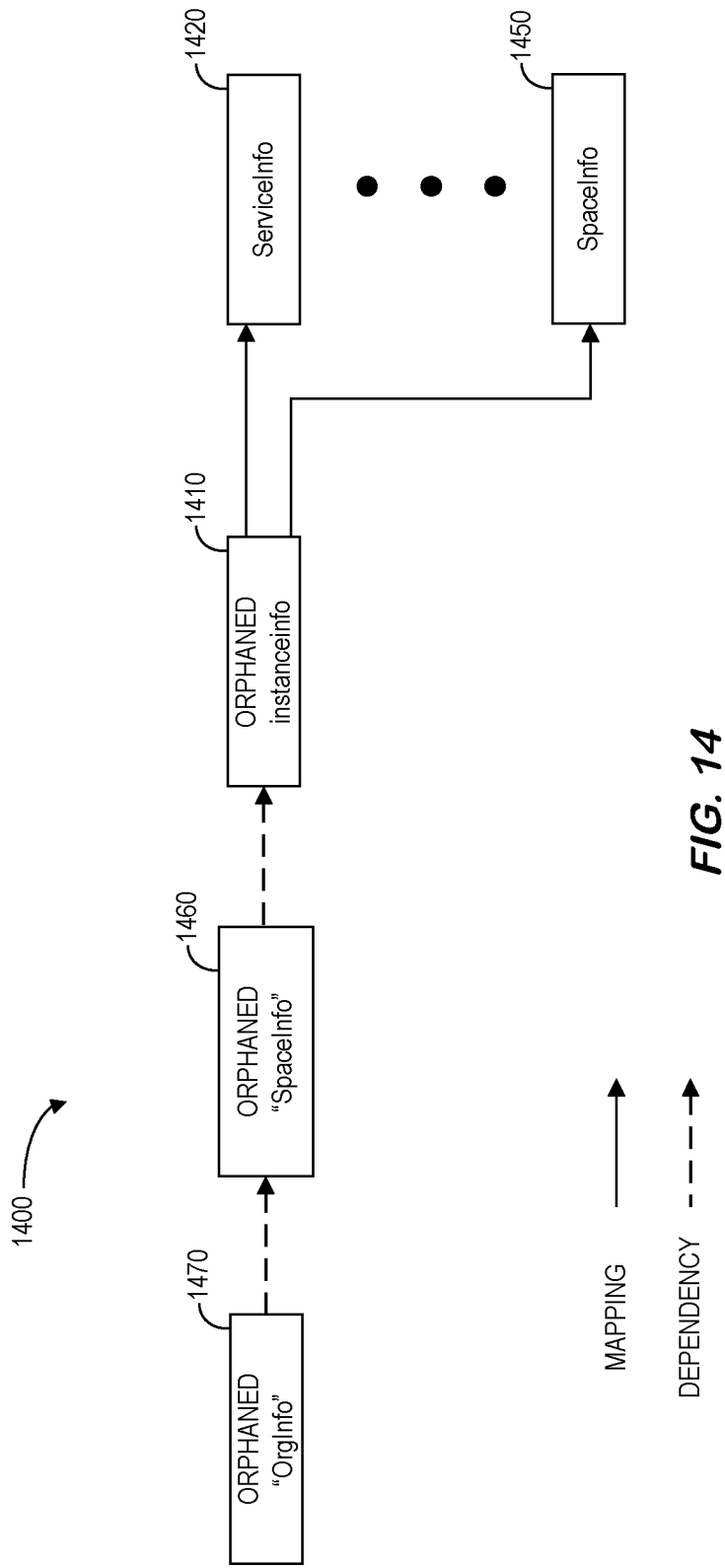
FIG. 14 illustrates a database schema for an "OrphanedOrg" table in accordance with some embodiments.
Figure 15:
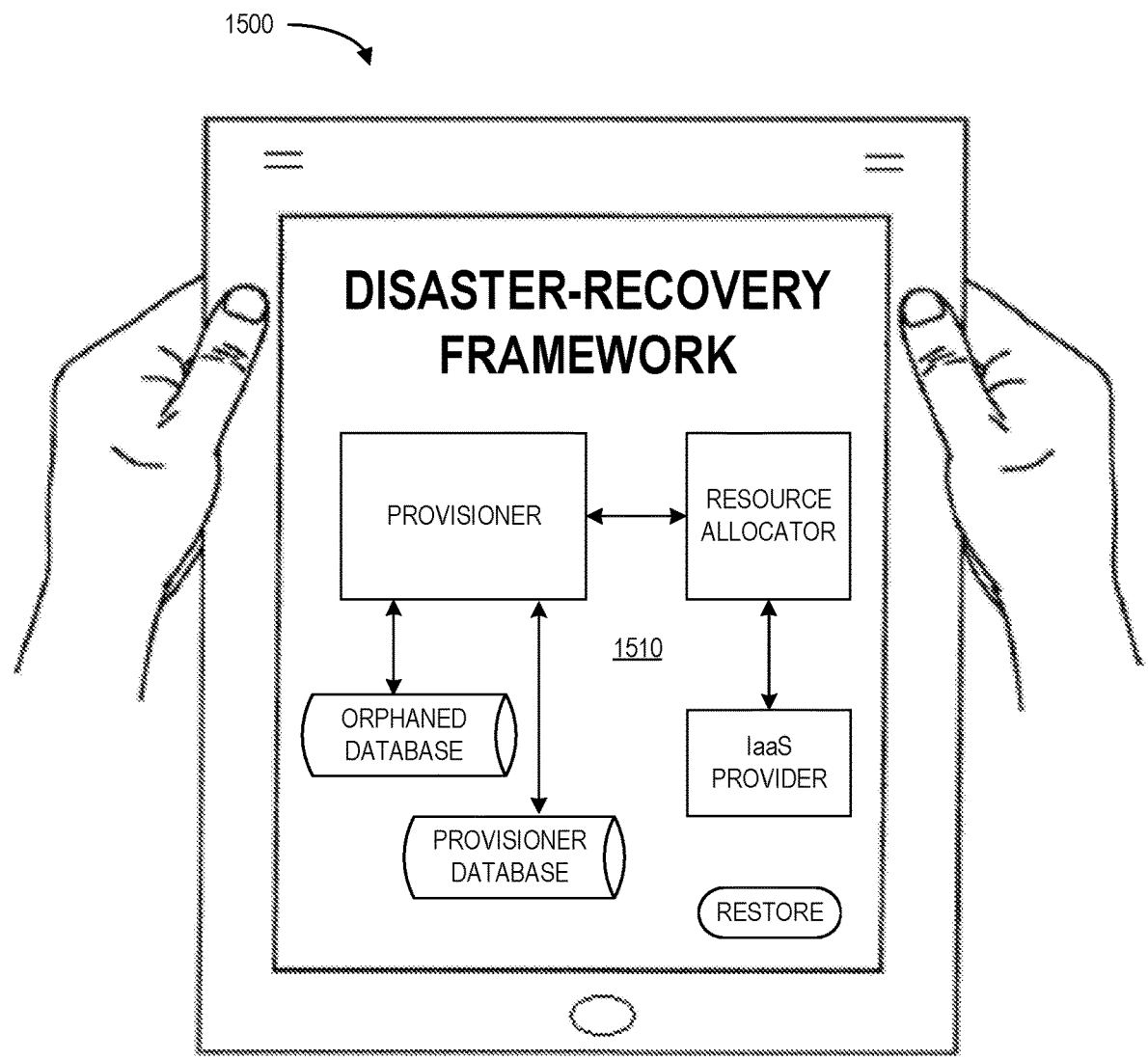
FIG. 15 illustrates a tablet computer according to some embodiments.

FIG. 13 illustrates a database schema 1300 for an "OrphanedSpace" table in accordance with some embodiments. The schema 1300 illustrates the dependency between orphaned SpaceInfo 1360 and orphaned instanceinfo 1310 along with the mappings of OrgInfo 1340, ServiceInfo 1320, and SpaceInfo 1350. FIG. 14 illustrates a database schema 1400 for an "OrphanedOrg" table in accordance with some embodiments. The schema 1400 illustrates the dependencies between orphaned OrgInfro 1470, orphaned SpaceInfo 1460, and orphaned instanceinfo 1410 along with the mappings of ServiceInfo 1420, and SpaceInfo 1450.

Thus, embodiments may provide a provisioner disaster-recovery framework for a Platform-As-A-Service offering in a fast, automatic, and accurate manner. Embodiments may recover from any form of disaster-based deletion or loss of resource for a provisioner in a PaaS offering deployed on a cloud. Some embodiments implemented substantial architectural changes in the state-of-the-art provisioner framework and introduce algorithms to recover from any type of disaster. Some embodiments may provide disaster recovery for an entire tenant in a provisioner framework. In other words, in any scenario of deletion of a resource, a user/customer may be able to recover to the previous state with zero-data loss and zero-re-configuration cost.

Note that embodiments may be associated with a recovery scenario in a PaaS offering. Thus, the recovery options may be considered from a PaaS perspective (rather an IaaS perspective), because the customer will generally not have any information regarding the IaaS mappings offered along with the PaaS resources. For example, suppose a customer has created an org (tenant) along with sub-tenants (space). The customer has now created several instances within them. Each such instance is necessarily the only information that the customer has/interacts with. The instance further must have mappings with an actual IaaS resource (e.g., a virtual machine and/or container) that the customer is unaware of. This mapping is maintained by the provisioner or a component such as a broker deployed on the provisioner. If the instance gets deleted, the normal flow of recovery is that the provisioner uses some logic to retrieve the IaaS resource information for the instance and requests the IaaS to recover the same. As described with respect to FIGS. 1, 2A, and 2B, such an approach has disadvantages.

If the customer deletes an entire tenant (org), the recovery expectation is that the tenant should be restored in the exact shape it was in before the deletion was triggered. This includes the data stored via the instance, the service-key bindings, the instances placed in proper tenants, etc. From an implementation point of view, this means to recreate the entire tenant, create sub-tenants within this tenant, spawn instances and recover data for each of these instances, restore the service-bindings, etc. Although the persistent disk information can be restored on an IaaS level, what IaaS resources did those instances in the PaaS layer (provisioner) refer to? This information is missing from a typical recovery process. Thus, embodiments described herein provide a way to store and recover IaaS related mappings and include an overall process to orchestrate the entire recovery such that all the previous dependencies are restored (e.g., which sub-tenant was present under the tenant, which instance was spawned in which sub-tenant, etc.). Note that embodiments might not be concerned with the configurations and the binaries/installations that come with a standard instance. Upon re-spawning the instances, configuration files (e.g., manifests) may help ensure that the instance is re-spawned properly. Embodiments may instead be concerned with persistent disk information from a PaaS perspective. If the customer is an IaaS level customer, it seems fairly straightforward to restore the IaaS resources with the tools offered out-of-the-box from the IaaS. When the customer is interacting at a PaaS level, however, a provisioner or a component/middleware deployed on a provisioner must take the responsibility to restore the IaaS resources. As a result, embodiments described herein enable a provisioner to store enough mappings to the IaaS resources enabling such a restoration.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of item and contracts, any of the embodiments described herein could be applied to other types of items and contracts. Moreover, the displays shown herein are provided only as examples, and any other type of user interface could be implemented. For example, FIG. 14 shows a tablet computer 1400 rendering a display 1410 that shows disaster-recovery framework components that may be adjusted (e.g., via a touch-screen) and/ initiated by a user.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A disaster-recovery system, comprising:
 a provisioner data store containing information about existing resources;
 an orphaned data store containing information about deleted resources; and a provisioner platform, coupled to the provisioner data store and the orphaned data store, adapted to perform the following:
  (i) receive a request, originated by a user, to create a first resource,
  (ii) generate a universally unique identifier U for the first resource that is not already associated with another resource in the provisioner data store,
  (iii) create and store mappings for the first resource, along with U, in the provisioner data store identifying Infrastructure-as-a-Service ("IaaS") resource information, and
  (iv) generate a response to the user indicating that the first resource has been provisioned.

2. The system of claim 1, wherein the system is associated with a Platform-as-a-Service ("PaaS") data center.

3. The system of claim 2, wherein the first resource is associated with at least one of: an instance, and an entire tenant.

4. The system of claim 1, wherein the provisioner platform is further adapted to perform the following:
  (v) receive a request, originated by the user, to delete the first resource,
  (vi) retrieve information about the first resource from the provisioner data store,
  (vii) verify that the first resource does not have any dependencies in the provisioner data store,
  (viii) store information about the first resource, including U, in the orphaned data store,
  (ix) store any first resource mappings from the provisioner data store into the orphaned data store,
  (x) delete information about the first resource from the provisioner data store, and
  (xi) generate a response to the user indicating that the first resource has been deleted.

5. The system of claim 4, wherein the provisioner platform is further adapted to perform the following:
  (xii) receive a request, originated by the user, to restore the first resource,
  (xiii) retrieve information about the first resource, including U, from the orphaned data store without requesting additional information from the user,
  (xiv) create and store mappings for the first resource in the provisioner data store identifying IaaS resource information,
  (xv) delete information about the first resource from the orphaned data store, and
  (xvi) generate a response to the user indicating that the first resource has been restored.

6. The system of claim 5, wherein the provisioner platform is further to verify that the first resource was deleted within a retention period before performing the restore.

7. The system of claim 5, wherein the provisioner platform is further to ask the user which of a plurality of potential resources should be restored.

8. The system of claim 1, further comprising:
  a platform manager to receive the request from the user and forward the request to the provisioner platform along with additional information.

9. The system of claim 8, wherein the platform manager is associated with at least one of: a web-server client, and a service broker.

10. The system of claim 1, wherein the provisioner platform further includes at least one of: an Application Programming Interface ("API") server, a tenant creation module, a tenant deletion module, a tenant state and information module, a restore tenant module, a instance creation module, an instance deletion module, an instance state and information module, a backup module, and a restore module.

11. The system of claim 1, further comprising:
  a resource allocator platform to receive information from the provisioner platform and, based on the received information, allocate cloud computing resources.

12. The system of claim 11, wherein the resource allocator platform further includes at least one of: a director manager, a resource allocation module, a resource deallocation module, and a resource information module.

13. A computer-implemented disaster-recovery method, comprising:
  receiving a request, originated by a user, to create a first resource;
  generating, by a provisioner platform, a universally unique identifier U for the first resource that is not already associated with another resource in a provisioner data store containing information about existing resources;
  creating and storing, by the provisioner platform, mappings for the first resource, along with U, in the provisioner data store identifying Infrastructure-as-a-Service ("IaaS") resource information; and
  generating a response to the user indicating that the first resource has been provisioned.

14. The method of claim 13, wherein the method is associated with a Platform-as-a-Service ("PaaS") data center.

15. The method of claim 14, wherein the first resource is associated with at least one of: an instance, and an entire tenant.

16. The method of claim 13, further comprising:
  receiving a request, originated by the user, to delete the first resource;
  retrieving information about the first resource from the provisioner data store;
  verifying that the first resource does not have any dependencies in the provisioner data store;
  storing information about the first resource, including U, in an orphaned data store containing information about deleted resources;
  storing any first resource mappings from the provisioner data store into the orphaned data store;
  deleting information about the first resource from the provisioner data store; and
  generating a response to the user indicating that the first resource has been deleted.

17. The method of claim 13, further comprising:
  receiving, by a platform manager, the request from the user; and
  forwarding the request to the provisioner platform along with additional information.

18. A non-transitory, computer readable medium having executable instructions stored therein, the medium comprising:
  instructions to receive a request, originated by a user, to create a first resource;
  instructions to generate, by a provisioner platform, a universally unique identifier U for the first resource that is not already associated with another resource in a provisioner data store containing information about existing resources;
  instructions to create and store, by the provisioner platform, mappings for the first resource, along with U, in the provisioner data store identifying Infrastructure-as-a-Service resource information; and instructions to generate a response to the user indicating that the first resource has been provisioned.

19. The medium of claim 18, wherein the medium is associated with a Platform-as-a-Service ("PaaS") data center.

20. The medium of claim 19, wherein the first resource is associated with at least one of: an instance, and an entire tenant.

* * * * *